US012620100B2

(12) United States Patent
Mukherjee et al.

(10) Patent No.: US 12,620,100 B2
(45) Date of Patent: May 5, 2026

(54) METHOD FOR DETECTING SPATIAL COUPLING

(71) Applicants: INSTITUT PASTEUR, Paris (FR); CENTRE NATIONAL DE LA RECHERCHE SCIENTIFIQUE—CNRS, Paris (FR)

(72) Inventors: Suvadip Mukherjee, Paris (FR); Thibault Lagache, Paris (FR); Jean-Christophe Olivo-Marin, Paris (FR)

(73) Assignees: INSTITUT PASTEUR, Paris (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 440 days.

(21) Appl. No.: 18/001,278

(22) PCT Filed: Jun. 11, 2021

(86) PCT No.: PCT/EP2021/065836

§ 371 (c)(1),
(2) Date: Dec. 9, 2022

(87) PCT Pub. No.: WO2021/250256

PCT Pub. Date: Dec. 16, 2021

(65) Prior Publication Data

US 2023/0237664 A1 Jul. 27, 2023

(30) Foreign Application Priority Data

Jun. 12, 2020 (EP) .................................... 20305649

(51) Int. Cl.
*G06T 7/11* (2017.01)
*G06T 7/00* (2017.01)
(Continued)

(52) U.S. Cl.
CPC .............. *G06T 7/11* (2017.01); *G06T 7/0012* (2013.01); *G06T 7/73* (2017.01);
(Continued)

(58) Field of Classification Search
CPC . G06T 7/11; G06T 7/73; G06T 7/0012; G06T 2207/10056; G06T 2207/10064;
(Continued)

(56) References Cited

U.S. PATENT DOCUMENTS

2014/0003702 A1 1/2014 Mcculloch

OTHER PUBLICATIONS

Lagache, Thibault, et al. "Mapping molecular assemblies with fluorescence microscopy and object-based spatial statistics." Nature communications 9.1, published Feb. 15, 2018, (Year: 2018).*
(Continued)

*Primary Examiner* — Oneal R Mistry
*Assistant Examiner* — Nhut Huy Pham
(74) *Attorney, Agent, or Firm* — Arrigo, Lee, Guttman & Mouta-Bellum LLP

(57) ABSTRACT

Method for detecting spatial coupling comprising the steps of: a. providing a set of data, b. identifying and segmenting a first and a second sets of objects of interest, wherein the objects of the second set are assimilated to punctual objects, c. determining, using a level set function, an expected number of objects of the second set present within a specified range of distances to at least one given object of the first set in case there were no interactions between said at least one given object of the first set and the objects of the second set, d. determining, using a level set function, an actual number of objects of the second set within the same range of distances to the at least one given object of the first set, and e. comparing said expected amount and said determined amount.

13 Claims, 6 Drawing Sheets

(51) Int. Cl.
*G06T 7/73* (2017.01)
*G06T 7/77* (2017.01)

(52) U.S. Cl.
CPC .............. *G06T 2207/10056* (2013.01); *G06T 2207/10064* (2013.01); *G06T 2207/20161* (2013.01); *G06T 2207/30024* (2013.01); *G06T 2207/30242* (2013.01)

(58) Field of Classification Search
CPC . G06T 2207/20161; G06T 2207/30024; G06T 2207/30242
See application file for complete search history.

(56) References Cited

OTHER PUBLICATIONS

Can, Tolga et al. "Efficient molecular surface generation using level-set methods." Journal of Molecular Graphics and Modelling 25.4, published 2006 (Year: 2006).*
Lagache, Thibault, et al. "Mapping molecular assemblies with fluorescence microscopy and object-based spatial statistics." Nature communications 9.1 (Year: 2018).*
Can, Tolga et al. "Efficient molecular surface generation using level-set methods." Journal of Molecular Graphics and Modelling 25.4 (Year: 2006).*
Lagache et al. Mapping molecular assemblies with fluorescence microscopy and object-based spatial statistics. Nat Comm, 2018, 9(1), 698, 1-15.
Anonymous. Level Set Method. Wikipedia, 2016, 1-4. https://en.wikipedia.org/w/index.php?title+Level_set_method&oldid=702381491.

* cited by examiner a b $K^0$: Normalized number of spots inside $\omega_{m,n}$, $m<n$ statistical
accumulation
of spots statistical threshold Level-set domains $\omega_{mn}$ Fig. 3b (continuation)

Multicolor image　　　Cy3 response　　　DAPI response　　　Cy3 + DAPI

| Widefield STORM | FITC response | RHOD response | merged | a-

METHOD FOR DETECTING SPATIAL COUPLING

The present invention relates to the field of spatial coupling and image processing which finds exemplary application in the medical field or in the fields of fluorescent microscopy, super resolution imaging, and histopathology.

The analysis of the spatial distribution of molecules and organelles in bioimaging remains a gold-standard for understanding cellular processes at the molecular level. Different imaging modalities can be used at different spatial scales, ranging from optical coherence tomography in histological samples to fluorescence and electron microscopy in molecular cell biology, to name a few. In fluorescence microscopy, the spatial proximity of molecules labeled with different colors (green and red typically) is usually quantified through their signal overlap or correlation (manifested as a yellow signal typically). However, developments in molecule labeling, optics and mathematical imaging have led to significant increase in spatial resolution (e.g. structured illumination and single-molecule localization microscopy (SMLM)), and made obsolete standard colocalization techniques. Indeed, when molecules are not directly described by their localization's estimate such as in SMLM, the microscope point spread function (PSF) is significantly reduced and spots of close molecules are not overlapping anymore, or only partially. Therefore, object-based methods that analyze the spatial relations between the objects' positions (single molecule localization or spots' center of mass) have been introduced over the past few years.

To compute the spatial proximity (or coupling) between objects' spatial distributions, a part of object-based methods are dedicated to SMLM and define clusters of molecules localizations with Voronoi tessellation or any other density-based clustering methods, before measuring the overlap between clusters. The other object-based methods, that can be used for any type of microscope, directly measure the distances between all individual objects (localizations or spots' centers) and summarize distances' information with the Ripley's K function or any other second-order spatial statistic.

In "Mapping molecular assemblies with fluorescence microscopy and object-based spatial statistics,", Lagache et al. Nat Commun, vol. 9, no. 1, p. 698, 02 2018, a Ripley-based statistic is used to show the statistical significance of the measured spatial coupling between individual objects is computed. For this, the expected Ripley statistic is characterized analytically under the null hypothesis of complete spatial randomness of objects within the field of view (FOV). Statistical analysis allowed to map all individual coupled objects, i.e. those that are significantly close given the geometry of the FOV.

By reducing the object's information to its spatial position, previous methods are not accurate when dealing with objects that are large and complex-in-shape. Typically, complex shapes arise when objects' size is larger than the PSF in standard fluorescence microscopy (e.g. cell edges, tubular organelles such as mitochondria or synaptic aggregates). Also, complex-shape objects can originate from localizations' clustering in SMLM. For the latter application, there has been little research to statistically measure the coupling of segmented clusters with single molecules' localizations.

There is thus a need to provide a method to describe the spatial coupling between the underlying random point process and larger objects, so as to identify spatial coupling.

An object of the present invention is therefore to provide a method for detecting spatial coupling comprising the steps of:

a. providing a set of data, for example imaging data, b. identifying and segmenting a first and a second sets of objects of interest, wherein the objects of the second set are assimilated to punctual objects, c. determining an expected number of objects of the second set present within a specified range of distances to at least one given object of the first set, and preferably a parameter allowing to estimate the variation of that expected number such as the variance, in case there were no interactions (for example as defined by a suitable null hypothesis on the spatial distribution of the objects in the second set with regard to the first set) between said at least one given object of the first set and the objects of the second set, d. determining an actual number of objects of the second set within the same range of distances to the at least one given object of the first set, and e. comparing said expected amount and said determined amount.

The comparison of step e can allow estimating the significant number of objects of the second set which are statistically above the expected accumulation for the aforementioned non-interacting case.

"Spatial coupling" or "spatial association" is to be understood as the colocalization of statistically coupled points.

Although the steps are presented in a specific order, the invention is by no mean limited to that specific order. Step c can be performed either before or after step d for instance. The order in which it is possible to perform the steps will be apparent to the one skilled in the art and can depend on the actual data collected.

Segmentation and identification can be done by any known techniques. "Identifying" is to be understood with a broad meaning: the purpose of the identification is merely to acknowledge the existence of the objects so as to allow their segmentation. It does not include obtaining specific information on the nature of the object.

Although the objects of the second set are assimilated to punctual objects, the objects of the first set can have more complex shape. Alternatively, the objects of the first set can also be assimilated to punctual objects. In that case, the method according to the present invention will still provide a substantial improvement over the existing method: better computational efficiency—the present invention provides a twentyfold speedup compared to existing method—and more importantly no need for data un-mixing in case of region overlap and no need for explicit boundary correction.

The term "assimilated" means that the object are considered to be punctual for the sake of the method. A punctual object is an object which can be described by a set of spatial coordinate, either in a bi-dimensional or a tridimensional space. However, it does not presume of the actual shape or size of the objects and any object could be part of first or second set. The less punctual the objects of the second set will be, the less accurate the method. As such, the present method can thus allow analyzing spatial coupling between several punctual objects, between punctual objects and objects presenting a more complex shape which can spread over a larger area, or even between several objects presenting a more complex shape which can spread over larger area regions.

Such objects presenting a more complex shape can be referred to as "regions" in the present document, and can be any closed shape defined in a bidimensional or tridimensional space, which can be represented explicitly by a closed contour (2D) or surface (3D) or, more generally, as the zero level set of a higher dimensional embedding function. Inputs corresponding to such complex objects to are typically represented as binary connected components in a bi-dimensional or a tri-dimensional digital image.

The first and second sets of objects of interest preferably comprise punctual objects and/or regions.

The data or punctual objects preferably comprise spatial coordinates, preferably bidimensional or tridimensional spatial coordinates, and/or temporal coordinates.

The objects of the first and second set can differ on any criterion such as but not limited to chemical nature, biological function, shape, size, fluorescent signature etc.

The determination of the expected amount (and the variance) of objects of the second sets within a specified range of distances to at least one given object of the first set in case there were no interactions between said given object of the first set and the objects of the second set can be done in any way. It may be done using a suitable prior model of the spatial distribution of the second set that describes no spatial interaction between the two sets.

A way may be to spatially model the distribution of the objects of the second set as a homogeneous Poisson process, although any method to model spatial independence could be used, including use of different sets of control data on which it is known that there are no interaction between similar objects.

An advantage of this modelling using homogeneous Poisson model is that the statistical characteristics of the interacting processes can be determined in an analytical form. Such analytical expressions eliminate the need to perform computationally heavy procedures (such as Monte-Carlo trials) to perform similar tasks.

After comparing the expected and actual amount, a report can be edited based on the comparison and possibly on additional data as well so as to provide indicators on the likelihood of spatial coupling. Said additional data can for instance depend on the objects of interest or on previous experiments.

Preferably, the spatial coupling to be identified is a molecular spatial coupling between molecular objects of interest. However, the method according to the present invention can have other application such as epidemiology so as to evaluate the spatial coupling between infected people and spatial landmarks such as hospitals, nursing homes, sanitary facilities and contaminant objects of all sort so as to get information on the progress of an illness.

In case of molecular spatial coupling, the provided set of data preferably includes biological tissue imaging data, more preferably medical imaging data or microscopy imaging data.

In case of a spatiotemporal application, the provided set of data can include spatiotemporal point-clouds from satellite images. A spatiotemporal application of interest is the analysis of epidemiological data.

Steps c and d are preferably performed for several objects of the first set. An average, spatial dispersion or any other relevant indicator can then be calculated so as to further characterize spatial coupling.

It is possible to repeat steps c and d for every objects of the first set so as to get more accurate data. Of course, artefacts can be sought for and expunged of the data. It is also possible to perform these steps for a sample of objects so as to simplify the method.

Preferably, steps c and d are performed for several given ranges of values of distances from the boundary of at least one given object of the first set. By considering a large number of narrow ranges of values, the spatial coupling can be assessed with a better accuracy. All the ranges of value can have the same spread or, alternatively, some ranges of value can be thinner than others so as to assess spatial coupling with an increased accuracy on sensitive distances.

Every distance in a given interval can be considered or, alternatively, some distances can be omitted. For instance, if assessing spatial coupling between 0 and 10 arbitrary units, the ranges of value could be [0;2],]2;4],]4;6],]6;8] and]8; 10] but it could also be [0;1],]1;6],]6;7], and [8;10].

Preferably, steps c and d comprise using a level set function which embeds implicitly the object(s) in the first set.

In step c and/or in step d, the determination using a level-set function may be an implicit shape embedding of the first set of objects via a level set function.

Another object of the present invention is a computer program product comprising code configured to, when executed by a processor or an electronic control unit, perform the method according to the present invention.

More generally, interaction between individual objects (biological entities, person, point-clouds, . . . ) belonging to two different sets (A and B), which can be physical interaction (in case of biomolecules) or co-presence of objects or persons in specific areas, usually leads to spatial association or spatial coupling.

The method may statistically detect, and characterize the spatial association or spatial coupling of objects B in the neighborhood of objects A. This association is measured through a function that computes the accumulation of objects of set B in the neighborhood of objects of set A.

This method may be able to analyze two sets A and B. Set A objects can be any closed shapes in 2D/3D, that includes small spots, large, segmented objects, or points (which are essentially circles/spheres with very small radius). Set B objects may be restricted to points only. These points may refer to the objects' center-of-mass, GPS coordinates, single molecule localization, etc.

The "neighborhood" of objects A may be mapped with the level-sets of an embedding function, that implicitly embeds the set-A objects. Typically, level-sets may correspond to the map of object distance relatively to the contour of objects A. To count the number of objects B in each level-set, the method may use the Generalized K function.

In order to eliminate false association of set B objects due to randomness, the method may adopt a statistical hypothesis testing framework, and first identify whether the association of B to A is significant. In the case it is, the method may proceed to evaluate the other attributes that characterize this spatial association or spatial coupling (p-value, average association distance, probability of association).

The following terms may be defined.

Spatial association or spatial coupling: spatial distribution of objects B may be associated to objects A, if the localizations of objects B depends on the localization of objects A. Typically, objects B will accumulate or scatter in the neighborhood of objects A.

Level-set: In mathematics, a level set of a real-valued function f of n real variables (n=2 or 3 typically) is a set of the form $$L_c(f) = \{(x_1, \ldots, x_n) | f(x_1, \ldots, x_n) = c\}$$

that is, a set where the function takes on a given constant value c. In many applications, the term iso-contour is also used. While level-set methods often refer to a category of image segmentation techniques in the image processing literature, the method may use the generic mathematical definition of level-sets of a signed distance function for this proposed solution.

Generalized K function: The generalized K function calculates the accumulation of points in set B within the level sets m and n. This is defined mathematically as $$K_{mn} = \frac{|\Omega|}{|B|} \sum_{j=1}^{|B|} \chi_{mn}(u_j), \text{ where } u_j \in B$$

Here, the region indicator function $\chi_{mn}(u)=1$ if $u \in \omega_{mn}$ and zero otherwise. When the spatial distribution of the set B objects follow the homogeneous Poisson distribution, this test statistic behaves as a Gaussian random variable.

Test statistic: A test statistic is a statistic (a quantity derived from the sample) used in statistical hypothesis testing. In the present case, the hypothesis that we are testing is the absence of spatial association or spatial coupling of objects B to objects A. Therefore, rejection of the null hypothesis indicates that objects B accumulate or scatter in the neighborhood of objects A.

Poisson spatial distribution: Poisson point process is a type of random mathematical object that consists of points randomly located on a mathematical space. The number of points of a point process N existing in a bounded region $B \subset \Omega$ is a random variable, denoted by N(B). If the points belong to a homogeneous Poisson process with parameter $\lambda > 0$, then the probability of n points existing in B is given by:

$$P\{N(B) = n\} = \frac{(\lambda|B|)^n}{n!} e^{-\lambda|B|}$$

where $|B|$ denotes the area of B.

Hypothesis testing framework for the method: To detect and characterize the potential accumulation or scattering of objects B in some level-sets around objects A, the method may analyze the statistical properties of the Generalized K function, and use this as a test statistic based on the Poisson point distribution of the spatial objects in B. If the test statistic is above a certain threshold, the accumulation of objects B is statistically characterized, meaning that objects B are spatially associated to objects A, and that both objects potentially interact. On the contrary, if the test statistic is below that threshold, it might be considered that there is no interaction.

The invention can be better understood at the reading of the detailed examples below, which constitute non-limitative embodiments of the present invention and at the examining of the annexed drawing, on which:

Figure 1:
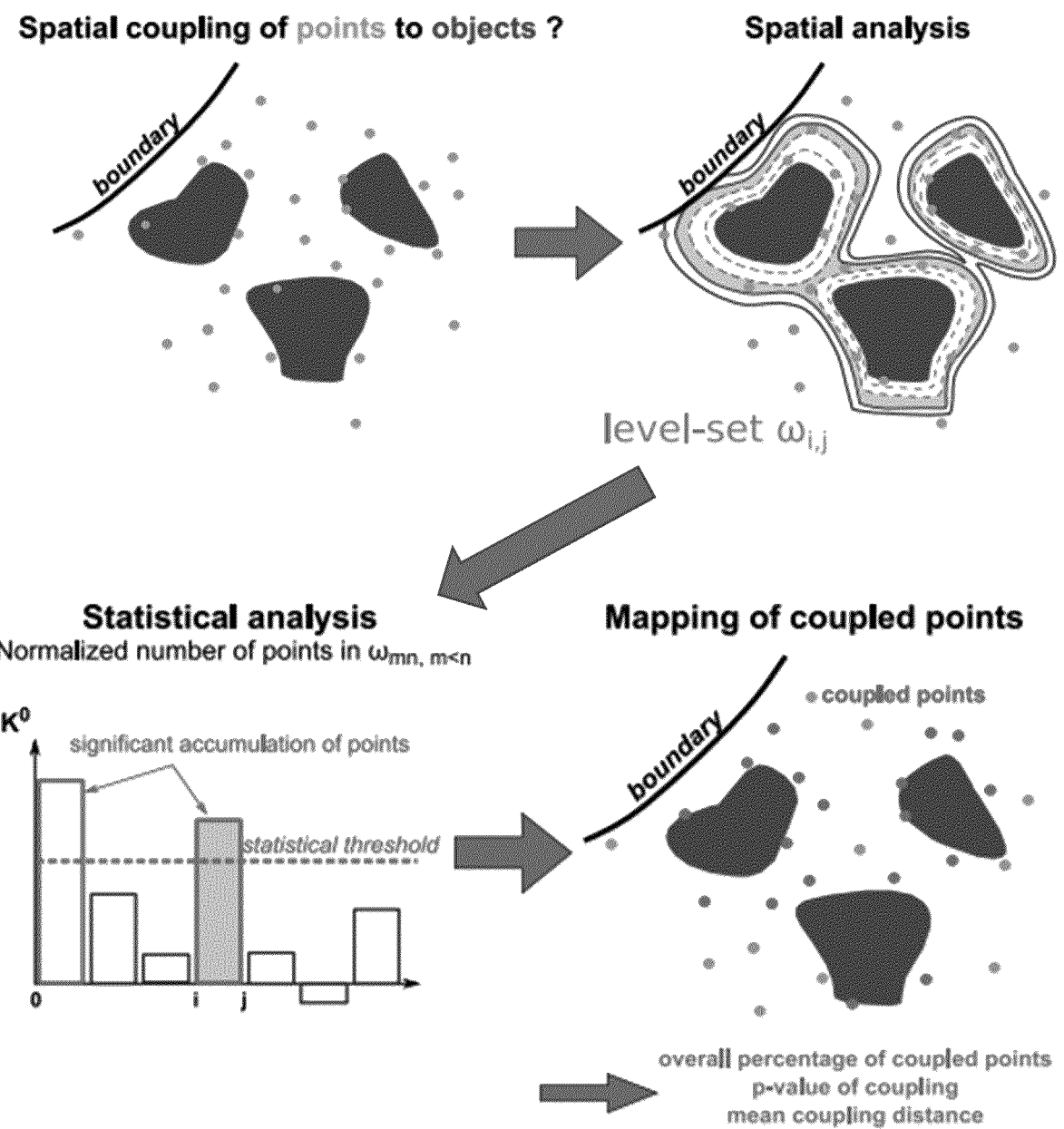
FIG. 1 is a schematic representation illustrating how to leverage level-sets for the analysis of coupling between points and larger objects.

The annexed drawing includes meaningful colors. Although the present application is to be published in black and white, a colored version of the annexed drawing was filed before the EPO.

Embedding Complex-Shaped Objects with Level-Sets

Let us define the domain of analysis to be $\Omega \subset \mathbb{R}^2$.

We consider the case of analyzing the co-localization of the elements of a set B to the set A. The set $A=\{s_1(p), \ldots, s_{n1}(p)\}$ of complex-shaped objects is represented with a collection of curves parameterized by p comprised in $[0;1]$. $B=\{u_1, \ldots, u_{n2}\}$ is a set of points $u_j=(x; y)$ in $\Omega$.

The set cardinalities are represented as $n_1=|A|$ and $n_2=|B|$. The method is graphically summarized in FIG. 1.

The method is designed for analyzing the spatial coupling of points (or small spotty objects, shown in cyan on FIG. 1) to larger and complex-in-shape objects (shown in red). We leverage level sets to embed the complex shape of large, red objects and map the distance of all FOV's points to embedded contours. We then compute the number of points in several, level-set delimited domains for m<n, and statistically characterize the expected distribution under the hypothesis of (cyan) points' complete spatial randomness. After having determined the level-set domains where there is a significant accumulation of points (normalized number of points $K^0_{mn}$ above statistical threshold, highlighted with a red dashed line), our analysis provides a statistical map of coupled points.

Since the shapes in A are defined over $\Omega$, one may define a continuous domain image b: $\Omega \rightarrow [0; 1]$ such that $b(x; y)=1$ for all pixels $(x; y)$ which are crossed by or enclosed (for closed contours) by at least one contour in A, and zero otherwise. The binary image $b(x; y)$ may be interpreted as the superposition of the (possibly overlapping) segments defined by the curves in A. We propose an implicit representation of the components in b by embedding the object boundaries as the zero level shape of a level set function. We introduce the Lipschitz function $\Phi$: $\Omega \rightarrow R$, which is defined as follows:

$$\phi(x, y) = \begin{cases} \leq 0 \forall (x, y) \in \omega \\ > 0 \forall (x, y) \in \Omega/\omega \end{cases} \tag{1}$$

Here $\omega$ represents the contours or the interior zone enclosed by the union of the closed curves in A. The advantage of embedding the shapes via the level set function is that it allows an implicit representation of the curves as the zero level set $\Phi$. Therefore, the region enclosed by the $m^{th}$ and $n^{th}$ level set of $\Phi$ may be represented as $\omega_{mn}=\{(x,y) | x \in H(n-\phi)-H(m-\phi)\}$, where $n>m \geq 0$ and $H(\Phi)$ is the standard Heaviside function.

Quantifying the Coupling of Points to Objects

We define the statistic $K_{mn}$ which is proportional to the number of events u of B which occur inside the region $\omega_{mn}$. Mathematically, $$K_{mn} = \frac{|\Omega|}{n_2} \sum_{j=1}^{n_2} \chi_{mn}(u_j) \text{ where } u_j \in B. \tag{2}$$

The region indicator function $\chi_{mn}(u)=1$ if $u$ belongs to $\omega_{mn}$ and zero otherwise. As $\chi_{mn}(u)$ is a Bernoulli random variable with parameter $p_{mn}$, $K_{mn}$ obeys the Binomial distribution. When the spatial points in B follow a homogeneous Poisson distribution and exhibit complete spatial randomness, this parameter may be computed to be $p_{mn}=|\omega_{mn}|/|\Omega|$.

Furthermore, K converges to the Normal law, expressed as K~N ($\mu_{mn}$, $\sigma_{mn}$) for sufficiently large n2. Our objective is to estimate the parameters of this distribution in a closed form under the assumption of a spatial randomness of the points in B. In a stochastic setup, we assume K to be a random variable with an associated distribution function. Therefore, the expected value of this random variable may be computed as $$\mu_{mn} = \mathbb{E}[K_{mn}] = \frac{|\Omega|}{n_2}\sum_{j=1}^{n_2}\mathbb{E}[\chi_{mn}(u_j)] \qquad (3)$$

$$= \frac{|\Omega|}{n_2} \times n_2\left(|\omega_{mn}|/|\Omega|\right) = |\omega_{mn}|$$

The variance of the statistic can be expressed as follows:

$$\sigma_{mn}^2 = \mathbb{E}\left[(K_{mn}-\mu_{mn})^2\right] = \mathbb{E}\left[K_{mn}^2\right] - \mu_{mn}^2 \qquad (4)$$

$$= \frac{|\Omega|^2}{n_2^2}\left(\sum_{i=1}^{n_2}\mathbb{E}[\chi_{mn}^2(u_i)] + \right.$$

$$\left.\sum_{i=1}^{n_2}\sum_{\substack{j=1\\j\ne i}}^{n_2}\mathbb{E}[\chi_{mn}(u_i)\chi_{mn}(u_j)] - n_2^2 p_{mn}^2\right)$$

Since $\chi_{mn}$ is a Bernoulli random variable with expected value $p_{mn}$, $E[\chi_{mn}^2(u)]=p_{mn}$ as well. Furthermore, the complete spatial randomness of the point process ensures that the location of a point $u_i$ of B is independent of another point $u_j$ of B for every $i\ne j$, which yields $E[\chi_{mn}(ui)\chi_\omega(uj)]=E[\chi_{mn}(ui)]E[\chi_{mn}(uj)]$.

Substituting this result in Eq. 4, we compute the variance as follows:

$$\sigma_{mn}^2 = \frac{|\Omega|^2}{n_2^2}\left(n_2 p_{mn} + n_2(n_2-1)p_{mn}^2 - n_2^3 p_{mn}^2\right) \qquad (5)$$

$$= |\omega_{mn}|(|\Omega| - |\omega_{mn}|)/n_2$$

Using vector notations, we have K=[K⁰, . . . , $K_{mn}$, . . . ]', M=[$\mu_0$, . . . , $\mu_{mn}$, . . . ]' and $\Sigma$=diag([$\sigma_0$, . . . , $\sigma_{mn}$, . . . ]') such that K~N(M,$\Sigma$).

Statistical Characterization of the Spatial Coupling

To statistically characterize the coupling of points to objects from the computed K vector, we first reduce it to $$K^0 = \Sigma^{-1}\cdot[K-M], \qquad (6)$$

which converges to a standard gaussian vector under the complete spatial randomness hypothesis: K⁰~N(0$_N$,1$_{N,N}$) where N is the length of the vector K, 0$_N$ a 0-vector of length N and 1$_{N,N}$ a N by N identity matrix. Components of K⁰ are independent random variables and we can therefore compute the probability that the maximum component of K⁰, which we denote sup$_N$[K⁰], is greater than arbitrary value x is equal to $$Pr\left\{\sup_N[K^0] > x\right\} = 1 - \prod_{0<m<n} Pr\{K_{mn}^0 < x\} = 1 - cdf^N(x). \qquad (7)$$

where cdf(x) is the cumulative density function of the normal gaussian law. Therefore, we can compute the p-value for rejecting the null hypothesis of points' complete spatial randomness (CSR) with $$p\text{-value }[CSR] = 1 - cdf^N\left(\sup_N[K^0]\right). \qquad (8)$$

The null-hypothesis framework ensures interpretability of the result. The fact that there are no tunable parameters and that no training data is required allows the process to operate fully unsupervised. To detect significant components of K⁰ where points accumulate around objects, we use the universal threshold T(N)=√(2 log(N)) introduced by Donoho and Johnston, and used for computing the significant components of a N-length vector corrupted with unit-variance, white noise. Thus, for each component $K^0_{mn}$>T(N) we estimate the number of coupled points $C_{mn}$ between level-sets 0<m<n, i.e. statistically above the expected number of points under complete spatial randomness, with $$C_{mn} = \chi_{\{K_{mn}^0 > T(N)\}}\left[\frac{n_2}{|\Omega|}(K_{mn}|\omega_{mn}|)\right] \qquad (9)$$

The indicator function $\chi$=1 if $K^0_{mn}$>T(N) and zero otherwise. Finally, for each point's position uj of B, for 1≤j≤n2, we can compute the probability pc(uj) that this point is coupled to objects of set A $$p_C(u_j) = \sum_{0<m<n} \chi_{mn}(u_j)\frac{C_{mn}}{K_{mn}}. \qquad (10)$$

The mean coupling distance $d_C$[B→A] of points of set B of objects of set A is therefore given by $$d_C[B \to 4] = \frac{1}{\sum_{1\le j\le n_2} p_C(u_j)}\sum_{1\le j\le n_2} p_C(u_j)d[d_j \to A], \qquad (11)$$

where the distance d [uj→A] of point uj to set A is equal to the minimum distance of uj to any pixel x; y such that the level set function Φ(x; y)=0: d [uj→A]=$_{minx;y\ s.t.\ \Phi(x;y)=0}$d [uj→(x,y)].

Validation with Simulations

To test the accuracy and robustness of our method, we generated synthetic sequences in Icy (http://icy.bioimageanalysis.org) with different levels of coupling between points and elongated objects.

Simulating Coupling with Elongated Objects

To simulate elongated objects with different shapes and length, we designed a stochastic algorithm where, for each object we simulate an open contour sj(p) with p comprised in [0; 1]: For each object 1≤j≤n1, we start by drawing a random initial position s(0) in the FOV $\Omega$, a 256_256 pixels square here. Then, for l=1::L, with L the length of objects, we compute iteratively the curvilinear position as sj (p=1/L)=sj((1−1)/L)+re$^{i\Theta 1}$ (in complex form). In our simulations r=1 and 01 follows a uniform random variable over [0;π].

We highlight that restricting the range of each independent random variable θ to [0; π] ensures that each object in the set A is rather elongated. Finally, from the simulated set of objects contours A for discretized curvilinear coordinate p=0, . . . 1/L, . . . , 1 we compute the pixelized level-set function Φ(x; y) such that Φ(x; y)=0 for each pixel (x; y) containing at least one curvilinear position [sj(1/L)] for 1≤j≤n1 and 0≤l≤L. To simulate the coupling of a given proportion 0≤α≤1 of n2 points of the set B to previously simulated objects of the set A, we simulate a Thomas process: we first randomly draw (1−α)n2 points in Ω. Then, for each remaining coupled point uk for 1≤k≤αn2, we choose randomly one simulated curvilinear position sj (1/L), and simulate the position $u_k$.

Finally, we generate the green B sequence by binarizing the pixels that contain at least one position $u_k$, 1≤k≤n2.

FIG. 2a shows regions for {m; n}={2; 4} (blue),{6; 8} (purple) and {10; 12} pixels (red). For each level of coupling (α=0; 0.1; . . . ; 1, n2=100 points, coupling distance~Nμc=1 pixel; σc=0:3 pixel)), FIG. 2b compares the level of coupling computed with Ripley-based analysis (in cyan) and the present level-set method (in red). Dashed black line corresponds to the ideal method that would measure exactly the same level of coupling than the simulated one. Standard errors for n=10 independent simulations per coupling percentage are shown Results For different levels of points coupling α=0; 0.1 . . . 1.0 and distance μc=1 pixel and σc=0:3 pixels, we compare the simulated and the measured percentage of coupling for increasing objects' length (L=1 corresponding to points, L=10 and L=30).

Figure 2:
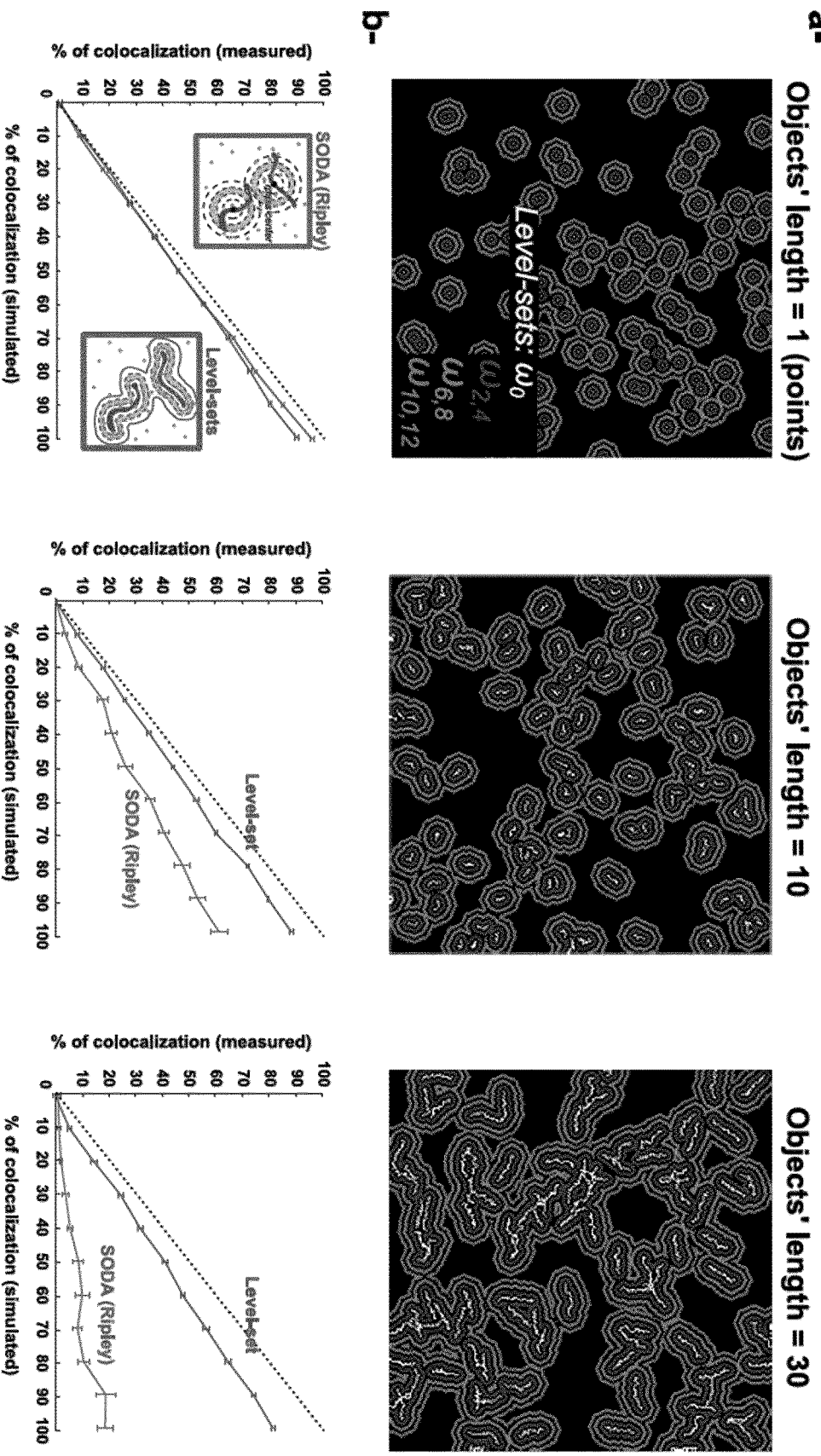
FIG. 2 is a comparison of the results of the method according to the present invention with method of the prior art depending on the shape of the objects considered.

Ideally, the measured percentage of coupling should be close to the simulated percentage, which corresponds to the black dashed line in FIG. 2. We also compare the accuracy of the method of the prior art with Ripley based analysis. We observed that, while level-sets and Ripley-based methods give similar results for pointillistic objects (L=1) and are both very close to ground truth (black dashed line), the accuracy of level-set method is maintained for longer objects whereas accuracy of Ripley-based analysis is degraded as objects' length increases. Indeed, Ripley-based analysis is based on the distance between the center-of-mass of elongated objects of set A and coupled points B, and is therefore less accurate when objects' length L increases. We highlight that our method slightly underestimates the simulated percentage of points' coupling, and that underestimation is more pronounced for longer A objects. This is due to the fact that, as the length of objects A increases, the area |ω$_{mn}$| contained between level sets 0<m<n increases together with the expected number of points inside |ω$_{mn}$| under complete spatial randomness. Therefore, while the total number of putative coupled points, i.e. the points that are inside level-set domains where a significant accumulation of points is detected, is close to the actual simulated number of coupled points, the coupling probability of each coupled point (Eq. 10) is decreased because the expected number of points inside |ω$_{mn}$| under complete spatial randomness increases with the area of |ω$_{mn}$|.

Figure 3:
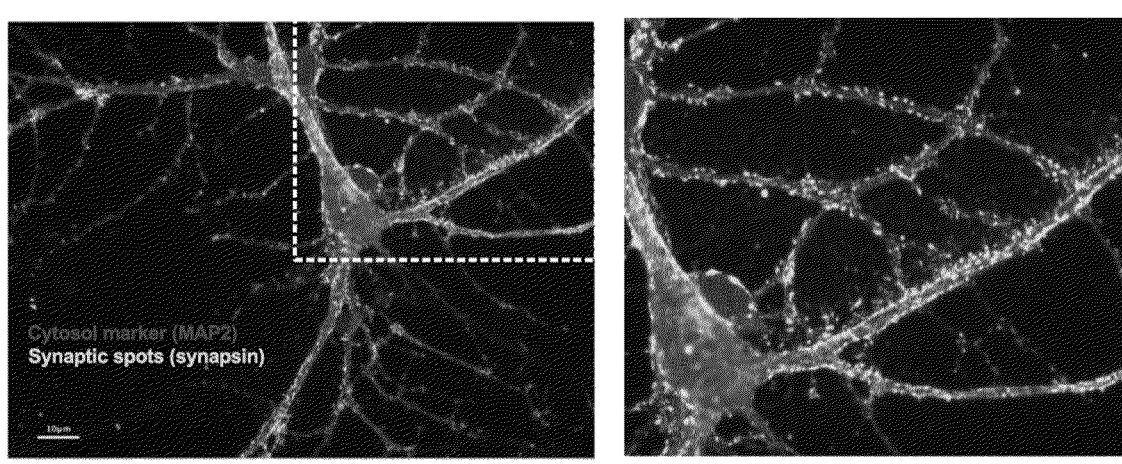
FIG. 3 shows measurements of the coupling of synaptic molecules to neuron's membrane with wide-field fluorescence microscopy using the method according to the present invention.
Figure 3:
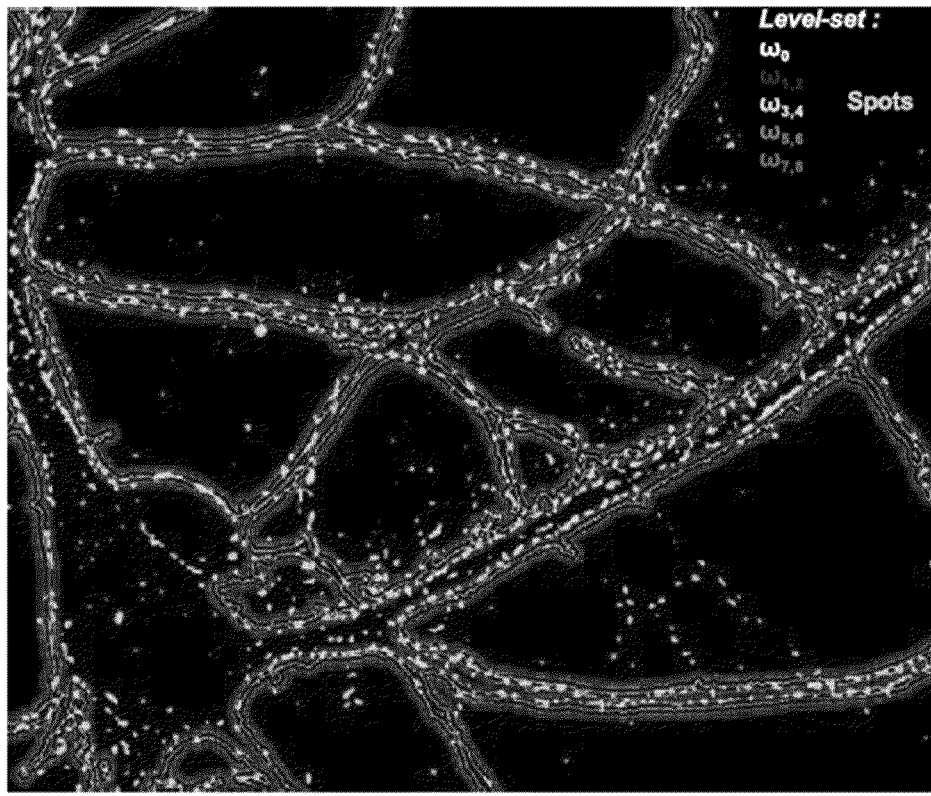

Using Wide-Field Fluorescence Microscopy to Measure the Coupling of Synaptic Spots to Neuron's Membrane To demonstrate an application in bioimaging, we use wide-field fluorescence imaging (FIG. 3) and measure the spatial coupling of pre-synaptic spots (Synapsin, labeled in green) with the dendrite of a post-synaptic neuron labeled with MAP2 (blue). Projecting axons of pre-synaptic neurons are known to be apposed to post-synaptic dendrites, and we expect to find a significant accumulation of Synapsin in close proximity to the cell boundary. We validate this phenomenon quantitatively using our proposed technique. Conventional colocalization methods are not applicable here, as the neuron dendrites are large, asymmetrical objects and the Synapsin spots are physically apposed, but not entirely superposed to the cell shapes.

Quantitative evaluations are performed on a set of 18 different images by designing a protocol in Icy. For spatial analysis, the set of objects (set A) is obtained by segmenting the MAP2 response using k-mean thresholding algorithm in Icy. Centroids of the Synapsin spots, automatically extracted via a wavelet-based spot detector constitute the point set B. Over 92% of the detected spots were found to be accumulated within the domains ωmn(0≤m<n≤9) defined by the level sets of the segmented cells, of which more that 89% spots were found to be statistically apposed to the cell shape with non-zero coupling probability (Eq. 10). Statistically significant accumulation of spots (p-value=10−178±18) were observed at an average coupling distance of 2.1 pixels, with a peak at a distance less than 100 nm from cell boundary. Additionally, our method also predicts the uncertainty in the spatial process via the average coupling probability $$\overline{p_C} = \frac{1}{n_2} \sum p_C(u_i) = 56.4\%.$$

This value is expected, as the dendrites span a considerable area which increases the risk of observing Synapsin accumulation due to chance. The distance of accumulation of synaptic vesicles are found to be in agreement with the typical size of synaptic buttons, and the quantitative results indeed suggest a strong association between the two markers used in this positive control.

To analyze the colocalization between points (or small spots) and complex-shape objects, we leveraged the versatility of level-sets to map objects contours and the distance of any point inside the FOV to the closest contour. After having characterized the expected points' distribution inside level-set domains under complete spatial randomness, we measured any significant accumulation of points and quantified the spatial coupling of points to objects. We validated our method with synthetic simulations, and showed that it outperforms standard Ripley-based analysis, especially for elongated objects. Finally, we highlight that the restriction of the level set function to the region of interest by using suitable boundary conditions, eliminates the need to explicitly correct for edge-artifacts. Therefore, our method provides a generic, and robust tool to study colocalization for a variety of problems commonly encountered in fluorescent microscopy, super resolution imaging, and histopathology.

Using the Method on Multicolor Images

Application 1

Figure 4:
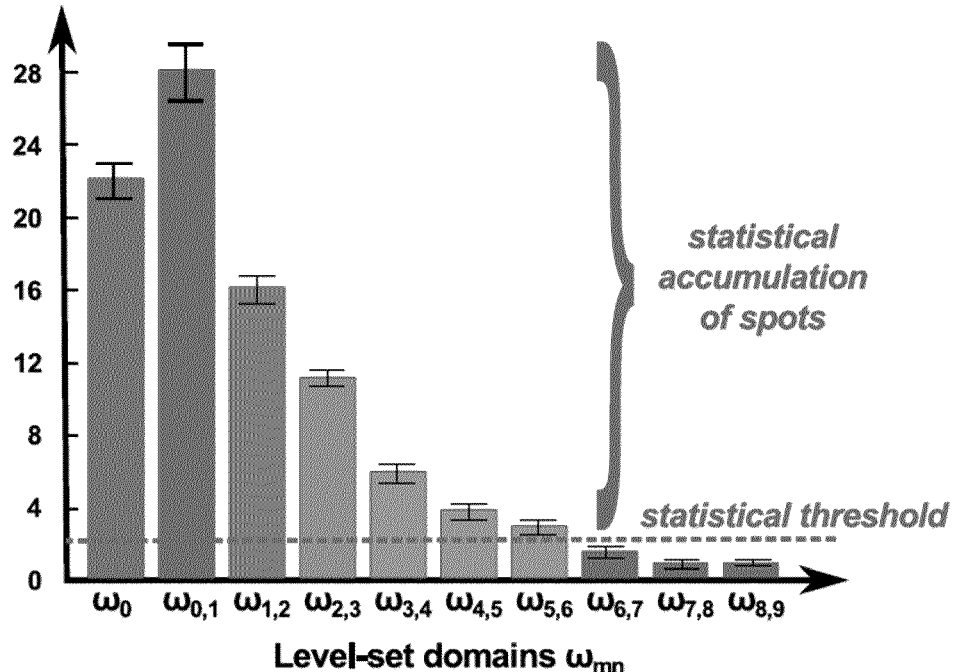
FIGS. 4 to 6 show the result of three different applications of the method according to the present invention on multi-colored images.
Figure 4:
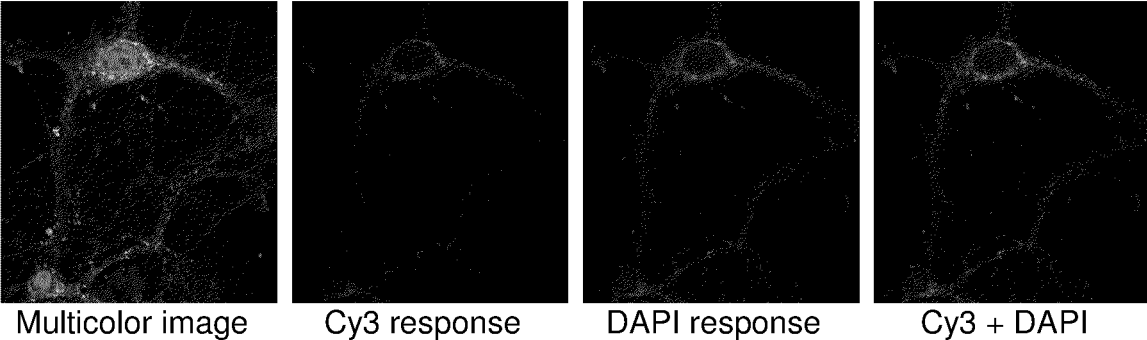

As shown on FIG. 4, the method according to the invention was used to determine the coupling between the CY3 channel (red) and the DAPI channel (green) response. The CY3 intensity image was reduced to binary spots (using the Icy plugin spot detector) and this serves as the first set for the method according to the invention.

The DAPI channel response was converted to point localizations by detecting the binary spots (using the Icy plugin spot detector) and estimating the positions of the center of masses of the spots.

Colocalization analysis on the above-mentioned channels using the method according to the present invention found statistically significant coupling (p-value=0) between the two channels, with a coupling index of 0.82, average coupling distance of 0.79 pixels, and an average coupling probability of 0.84. These findings support the qualitative observation of the merged channel (last column) which shows a significant response in yellow, thereby signifying co localization.

Application 2

Figure 5:
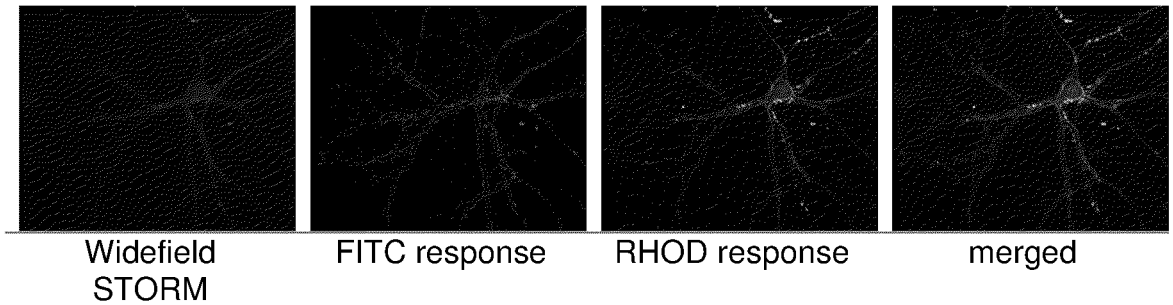

As shown on FIG. 5, the method according to the present invention was used to determine the coupling between the FITC channel (red) and the RHOD channel (green) response. The FITC intensity image was reduced to binary spots (using the Icy plugin spot detector) and this serves as the first set for the method.

The RHOD channel response was converted to point localizations by detecting the binary spots (using the Icy plugin spot detector) and estimating the positions of the center of masses of the spots.

The method according to the invention allowed finding statistically significant coupling (p-val=1e-19) between the channels, although the coupling index is lower than the previous experiment (0.46). The couples were present at an average distance of 2.7 pixels, which explains the absence of yellow response in the merged channels, although the distribution of the individual channels indicate spatial correlation. Average Coupling probability was determined to be 0.61.

Application 3: Local Investigation Inside a Predefined Region of Interest

Figure 6:
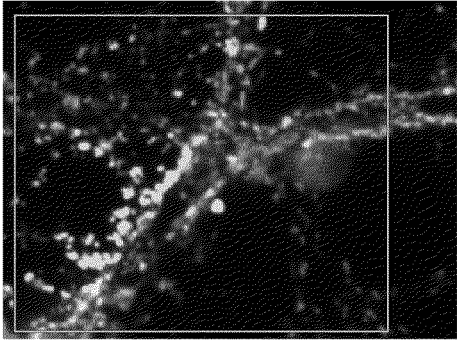

A local region of interest (ROI) was selected on the previous wide-field image of FIG. 5 so as to analyze the colocalization of the green channel response on the red channel. This ROI is depicted on FIG. 6. Qualitatively, it appears that the two channels are un-correlated. This is established by using the method according to the present invention which finds an average coupling of 0.03 between the red and green channels with a p-value of 0.01 and average coupling distance of 3.5 pixels. It is interesting to note that the method according to the present invention can be used on a portion of interest of an image and need not to be performed on a full image.

It is understood that the described embodiments are not restrictive and that it is possible to make improvements to the invention without leaving the framework thereof.

Unless otherwise specified, the word "or" is equivalent to "and/or". Similarly, the word 'one' is equivalent to 'at least one' unless the contrary is specified. Unless otherwise specified, all percentages are weight percentages.

Application for Spatio-Temporal Data Analysis

In order to develop and validate predictive models for early detection of epidemics or monitoring thereof, the present document propose a method for statistical analysis of spatio-temporal point cloud data. Such spatio-temporal point-clouds may correspond to GPS coordinates of individuals, or may represent physical geolocations such as local clusters or epidemiological hot-spots. In contrast to existing techniques that measure interaction by simply counting local associations between two spatial sets, the present document provide a robust mechanism to measure statistically significant interaction between spatio-temporal data sets. Given a set of reference spatial localizations (such as a group of individuals, geographical hot-spots or disease containment zones), the method provides a temporal index of association between the reference and an observed spatial dataset realized over time.

Figure 7:
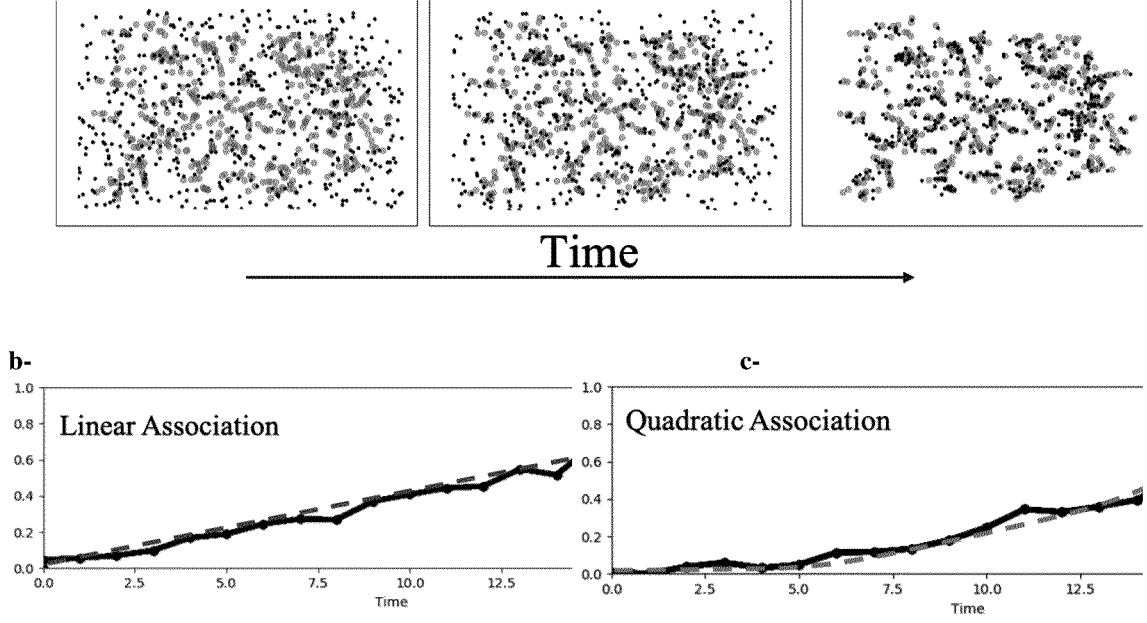
FIG. 7 shows an application of the method to an epidemiological application.

To illustrate said method, an epidemiological case study is simulated in FIG. 7. In FIG. 7 (*a*), we analyze the association between reference geolocations (in green, representing, for example, disease containment zones) to synthetic spatial geo-locations of individuals (in black). Each temporal snapshot corresponds to the spatial spread of infection with respect to the containment zones. Ideally, the epidemic is considered well contained when the infected individuals (black dots) are statistically coupled to the reference. In FIGS. 1(*b*) and (*c*), we plot infection containment indices over time, corresponding to a linear, and a quadratic model respectively. The computed temporal index accurately predicts the rate of infection containment, or spread, over time. It could, therefore, be used as a robust quantitative tool to monitor disease outbreaks, and to take informed decisions based on the epidemiological findings.

The invention claimed is:

1. Method for detecting spatial coupling comprising the steps of:
   a. providing a set of data,
   b. identifying and segmenting a first and a second sets of objects of interest, wherein the objects of the second set are assimilated to punctual objects,
   c. defining a plurality of distance-based analytical zones around at least two given objects of the first set by using a level set function derived from a boundary of the union of the objects of the first set, and determining an expected number of objects of the second set present within said analytical zones, wherein said expected number is determined under an assumption of no interactions between said given object of the first set and the objects of the second set,
   d. determining, using a level set function, an actual number of objects of the second set within at least one of said analytical zones, and
   e. comparing said expected amount and said determined amount.

2. The method according to claim 1 wherein the set of data is a set of imaging data.

3. The method according to claim 1 wherein the spatial coupling to be identified is a molecular spatial coupling between molecular objects of interest.

4. The method according to claim 3 wherein the provided set of data includes a biological tissues imaging data.

5. The method according to claim 3 wherein the provided set of data includes microscopy imaging data.

6. The method according to claim 1 wherein steps c and d are repeated for all objects of the first set.

7. The method according to claim 1 wherein steps c and d are performed for several different sets of analytical zones.

8. The method according to claim 7 wherein the different sets of analytical zones are not consecutive.

9. The method according to claim 1 wherein the data comprise spatial coordinates and/or temporal coordinates.

10. The method according to claim 1 wherein the first and second sets of objects of interest comprise punctual objects and/or regions.

11. A non-transitory computer program product comprising a non-transitory computer-readable medium storing code configured to, when executed by a processor or an electronic control unit, perform the method according to claim 1.

12. The method of claim 4, wherein the biological tissues imaging data is medical imaging data.

13. The method of claim 9, wherein the coordinates are bidimensional or tridimensional spatial coordinates, and/or temporal coordinates.

* * * * *